April 18, 1950
C. TRURAN
2,504,907
PUSHCART
Filed Nov. 18, 1947
3 Sheets-Sheet 1
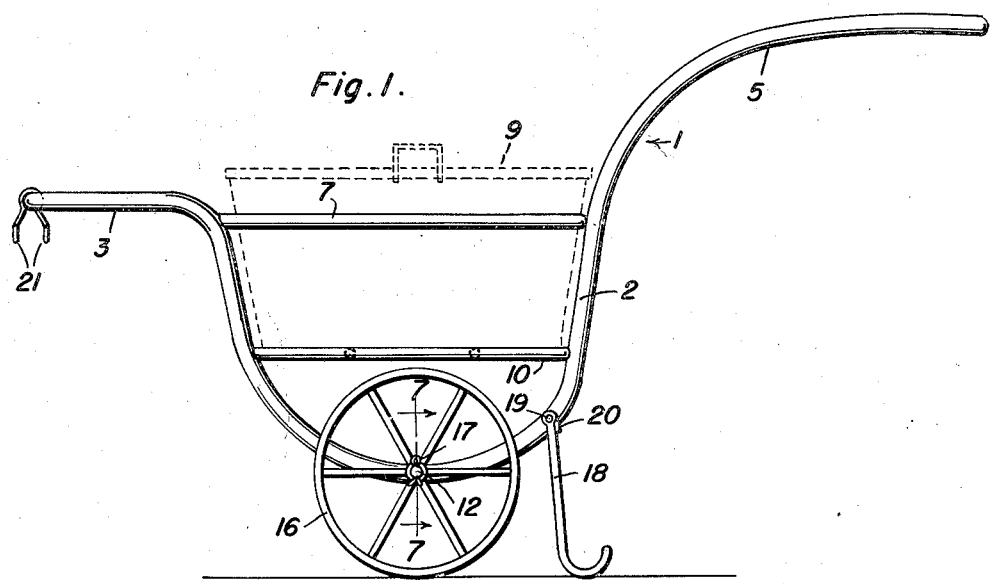
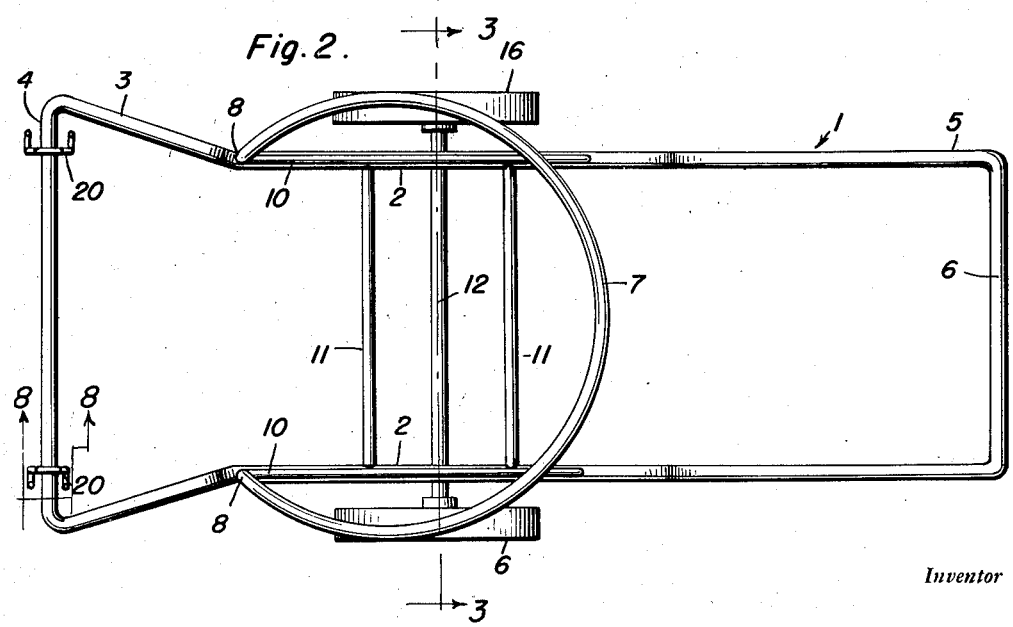
Inventor
Charles Truran
By *Clarence A. O'Brien and Harvey B. Jacobson*
Attorneys April 18, 1950 C. TRURAN 2,504,907
PUSHCART
Filed Nov. 18, 1947 3 Sheets-Sheet 2
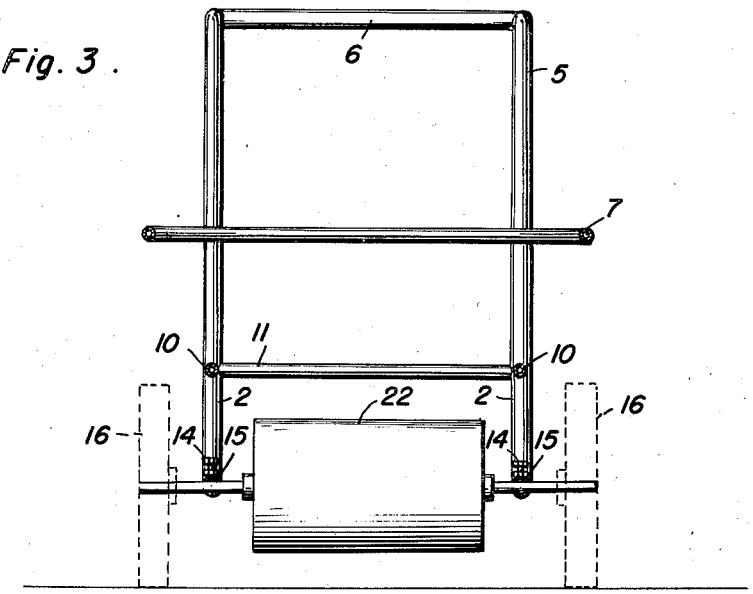
Fig. 3.
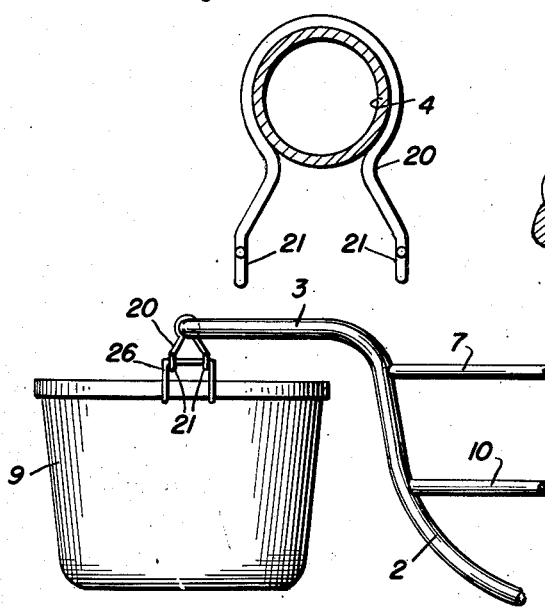
Fig. 8.
Fig. 4.
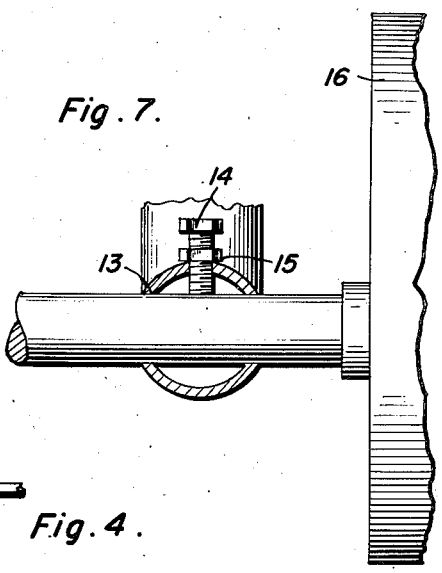
Fig. 7.
Inventor
Charles Truran
By Clarence A. O'Brien
and Harvey B. Jacobson
Attorneys April 18, 1950     C. TRURAN     2,504,907
PUSHCART Filed Nov. 18, 1947     3 Sheets-Sheet 3

Inventor

Charles Truran

By *Clarence A. O'Brien and Harvey B. Jacobson*
Attorneys

Patented Apr. 18, 1950

2,504,907

UNITED STATES PATENT OFFICE 2,504,907

PUSHCART

Charles Truran, Detroit, Mich.

Application November 18, 1947, Serial No. 786,739

3 Claims. (Cl. 280—51)

My invention relates to improvements in combination push carts and ground rollers.

The primary object of the invention is to provide a simply constructed, strong, easily handled push cart especially adapted for use in transporting loaded bushel baskets, and lifting the same, particularly in gardening, and which is convertible into a ground roller for levelling lawns or the like, and also convertible for use as a shopper's cart in marketing.

Other and subordinate objects, within the purview of my invention, together with the precise nature of my improvements, will be readily understood when the succeeding description and claims are read with reference to the drawings accompanying and forming part of this specification.

In said drawings:

Figure 1 is a view in side elevation of my improved push cart in a preferred embodiment thereof illustrating the manner in which the same is used in transporting a loaded bushel basket shown in broken lines;

Figure 2 is a view in plan of the cart;

Figure 3 is a view in transverse vertical section taken on the line 3—3 of Figure 2 showing the cart converted for use as a ground roller;

Figure 4 is a fragmentary view in side elevation illustrating the manner in which the cart is used in lifting a loaded bushel basket;

Figure 7 is a fragmentary view in vertical transverse section taken on the line 7—7 of Figure 1 and drawn to a larger scale; and Figure 8 is a view in transverse section taken on the line 8—8 of Figure 2 and drawn to a larger scale.

Figure 5:
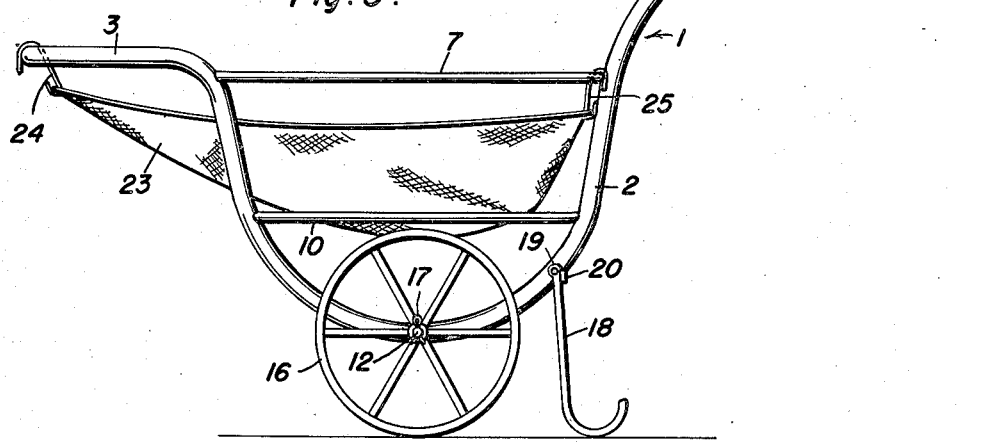
Figure 5 is a view in side elevation illustrating the cart converted for use for shopping purposes.
Figure 6:
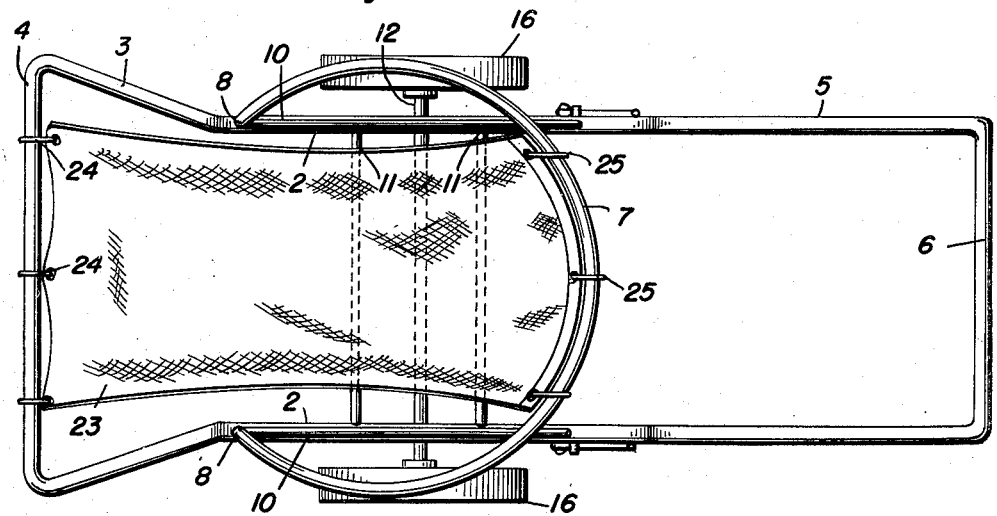
Figure 6 is a view in plan of the same.

Referring to the drawings by numerals, my improved push cart as shown comprises a frame 1 including a pair of upright, center, side sections 2 of U-shape spaced apart in parallel planes, said sections 2 being connected at what constitutes the front of said frame 1 by a forwardly extending and flaring section 3 including a front cross bar 4, and said sections 2 being similarly connected at the rear of said frame 1 by an upwardly and rearwardly curving handle section 5 including a rear hand grip cross bar 6. The sections 2, 3 and 5 together with the cross bars 4, 6 are formed, preferably, in one piece of bent, continuous metal tubing.

An upper, broken circle, tubular basket support 7 in the upper portion of the sections 2 has its ends 8 suitably fixed, as by welding, not shown, to said sections 2 near the juncture of said sections 2 with the section 3, said support 7 extending rearwardly, horizontally to the rear of said sections 2 near the juncture of said sections 2 with the handle section 5, where it is suitably secured to said sections 2 in the same manner as its front ends 8. The upper basket support 7 bulges outwardly beyond the sections 2 for a purpose presently seen and is of the proper size to surround, in greater part, the upper portion of the usual bushel basket represented in broken lines in Figure 1 and designated 9.

Below the upper basket support 7, a pair of tubular, metal, side rods 10 connect the sides of the sections 2 and are suitably secured to said sections to extend parallel with said upper support 7. A pair of tubular, metal, basket-supporting cross rods 11 connect the side rods 10.

A cylindrical axle bar 12 is slidably extended through suitable openings, as at 13, in the bends of the sections 2 in the center of said sections and is removably secured in said openings by bolts 14 with lock nuts 15 thereon.

A pair of ground wheels 16 are rotatably mounted upon opposite ends of the axle bar 12 and are removable therefrom for a particular purpose presently seen. Cotter pins 17, or the like, secure said wheels 16 on said axle bar 12.

A suitable leg 18 is pivoted at an upper end thereof on one section 2, as at 19, for swinging rearwardly and downwardly against a stop lug 20 on said section 2 and engagement with the ground to support the frame 1 in a position of rest and against tilting downwardly and rearwardly on the ground wheels 16. In this connection, it is explained that the handle section 5 is longer than the front section 3 to overbalance the frame 1 into a rest position when said leg 18 is engaged with the ground. The leg 18 may be swung forwardly and upwardly to frictionally lock on its pivot 19 in an idle position, in a manner which will be clear.

A pair of resilient wire clips 20 straddling the front cross bar 4 and slidable along the same with hooked lower ends 21 serve a purpose presently explained. The clips 20 may be removed if desired.

A roller 22 of smaller diameter than the ground wheels 16 is provided for rotation on the axle bar 12.

An elongated apron 23, preferably of canvas, is provided for extending in the frame 1 between the front cross bar 4 and the upper basket support 7 with hooks 24, 25 on its opposite ends adapted to catch over the front cross bar 4 and said support 7 to hold said apron 23 suspended at its ends in said frame 1. The apron 23 is designed to assume a trough-like shape when loaded with market commodities and the like.

In using the described cart in transporting a loaded bushel basket, such as shown by the broken lines in Figure 1, the basket 9 is placed in the upper basket support 7 to rest on the basket-supporting cross rods 11. The frame 1 may then be tilted on the ground wheels 16, by means of the hand grip bar 6, to balance the loaded basket 9, in a manner which will be clear, so that the cart may be easily shoved, or pulled, where desired without any fatiguing amount of weight being imposed on the arms of a person using the cart.

When it is desired to lift a loaded bushel basket from the ground, the frame 1 may be tilted forwardly on the ground wheels 16 and the clips 20 positioned along the front cross bar 4 so that the hook ends 21 of said clips may be hooked into the usual side handles 26 of such baskets 9, for instance, as shown in Figure 4. Then the frame 1 may be tilted rearwardly on the ground wheels 16 to lift the loaded basket 9 easily for removal from said hooked ends 21 as and when desired.

To convert the described cart for ground-rolling purposes, the ground wheels 16 are removed, also, the axle bar 12, and said axle bar replaced with the roller 22 rotatably carried thereby between the sections 2. Then the frame 1 may be pushed, or pulled, to propel said roller 22 over the ground as desired. If additional weight is desired in the rolling operation, a bushel basket 9 loaded with dirt, or stones, may be positioned in the frame 1 in the manner already described, to provide such weight. The roller 22 may be left on the axle bar 12, optionally, with the ground wheels 16 when using the cart for transporting purposes to act as a weight for stabilizing the cart against lateral tilting, and as shown by the broken line representation of said wheels in Figure 3.

In converting the described cart into a shopping cart, the apron 23 is applied in the manner already described and used as a sling-like support for market, or other commodities. The apron 23 may also be used as a support for a child, as will be clear.

The foregoing will, it is believed, suffice to impart a clear understanding of my invention without further explanation.

Manifestly, the invention, as described, is susceptible of modification, without departing from the inventive concept, and right is herein reserved to such modifications as fall within the scope of the appended claims.

Having described the invention, what is claimed as new is:

1. A cart comprising a frame including a pair of upright side sections of U-shape spaced apart parallel to receive therein opposite sides of a basket positioned downwardly in the same, a forwardly extending section connecting said side sections and embodying a front cross bar, and a rearwardly extending handle section connecting said side sections and embodying a hand grip cross bar, an axle bar extending through the bends of said side sections with a pair of ground wheels thereon, an upper broken circle member in said sections having ends connected thereto and adapted to extend horizontally to partly encircle and confine a basket positioned therein, said member being wider than the distance between said side sections and bulging therethrough outwardly of the same to accommodate the basket therein, a pair of side rods in said side sections connected thereto and below said member, and cross rods connecting said side rods and adapted to support a basket positioned in said member.

2. A cart comprising a frame including a pair of upright side sections of U-shape spaced apart substantially parallel to receive therein opposite sides of a basket positioned downwardly in the same, a forwardly extending section connecting said side sections and embodying a front cross bar, a rearwardly extending handle section connecting said side sections and embodying a hand grip cross bar, a horizontal broken circle member in said side sections having ends connected thereto and adapted to partly encircle and confine a basket positioned therein, said member being wider than the distance between said side sections and bulging therethrough outwardly thereof to accommodate the basket therein, means below said member and intermediate said sections for supporting the basket, an axle bar supporting said side sections, and rotatable ground-engaging means on said axle bar.

3. A cart comprising a frame including a pair of upright side sections of U-shape spaced apart parallel, a forwardly extending and flaring section forming a continuation of said side sections and including a front cross bar, a rearwardly extending handle section connecting said side sections and forming a continuation thereof, an axial bar extending through the bends of said side sections with rotatable ground engaging means thereon and above which said cross bar is normally elevated a substantial distance from the ground by said side sections when the cart is being propelled by the handle section, said frame being tiltable on said ground engaging means to lower and raise said cross bar, and means on said cross bar for fastening to a basket on the ground when said cross bar is lowered and whereby said basket may be lifted and suspended on said cross bar when said frame is tilted to elevate the cross bar into normal position.

CHARLES TRURAN.

REFERENCES CITED

The following references are of record in the file of this patent:

UNITED STATES PATENTS

| Number | Name | Date |
|---|---|---|
| 633,998 | Hill | Oct. 3, 1899 |
| 758,343 | Wirt | Apr. 26, 1904 |
| 2,071,889 | McGlynn | Feb. 23, 1937 |
| 2,433,754 | Belko | Dec. 30, 1947 |

FOREIGN PATENTS

| Number | Country | Date |
|---|---|---|
| 22,733 | Great Britain | 1900 |